Patented Mar. 22, 1927.

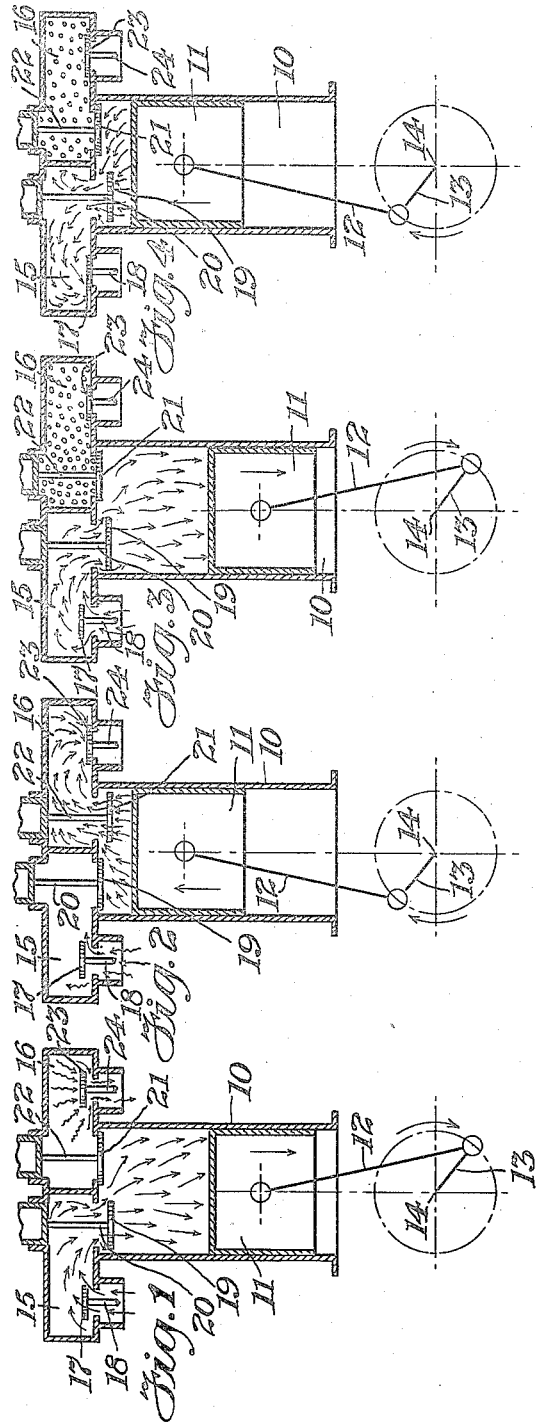
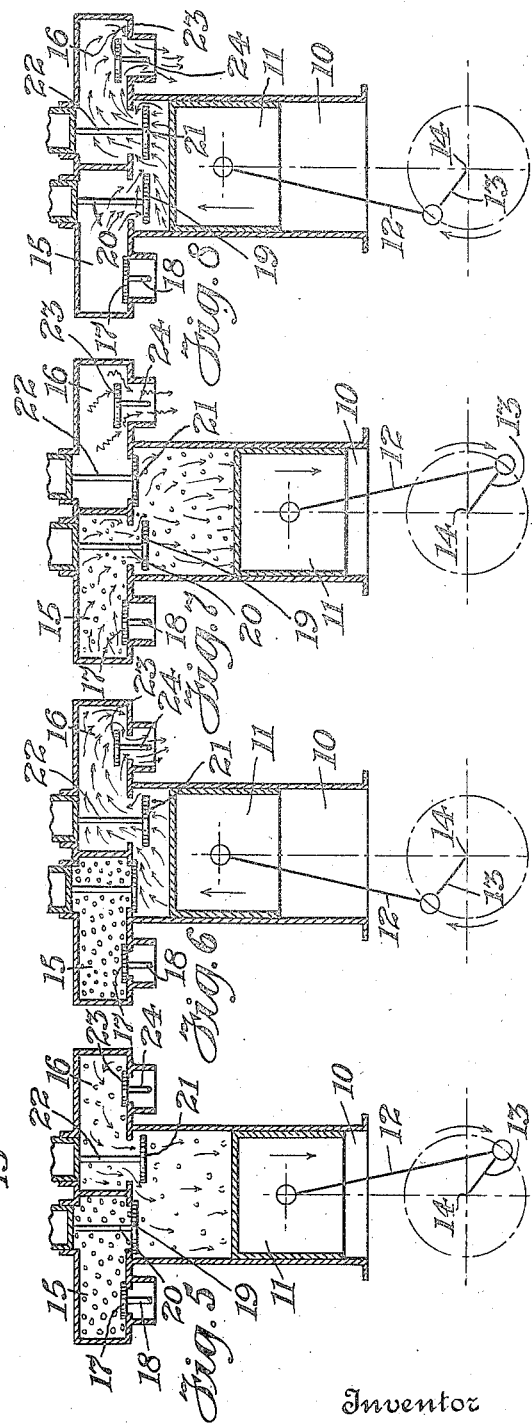

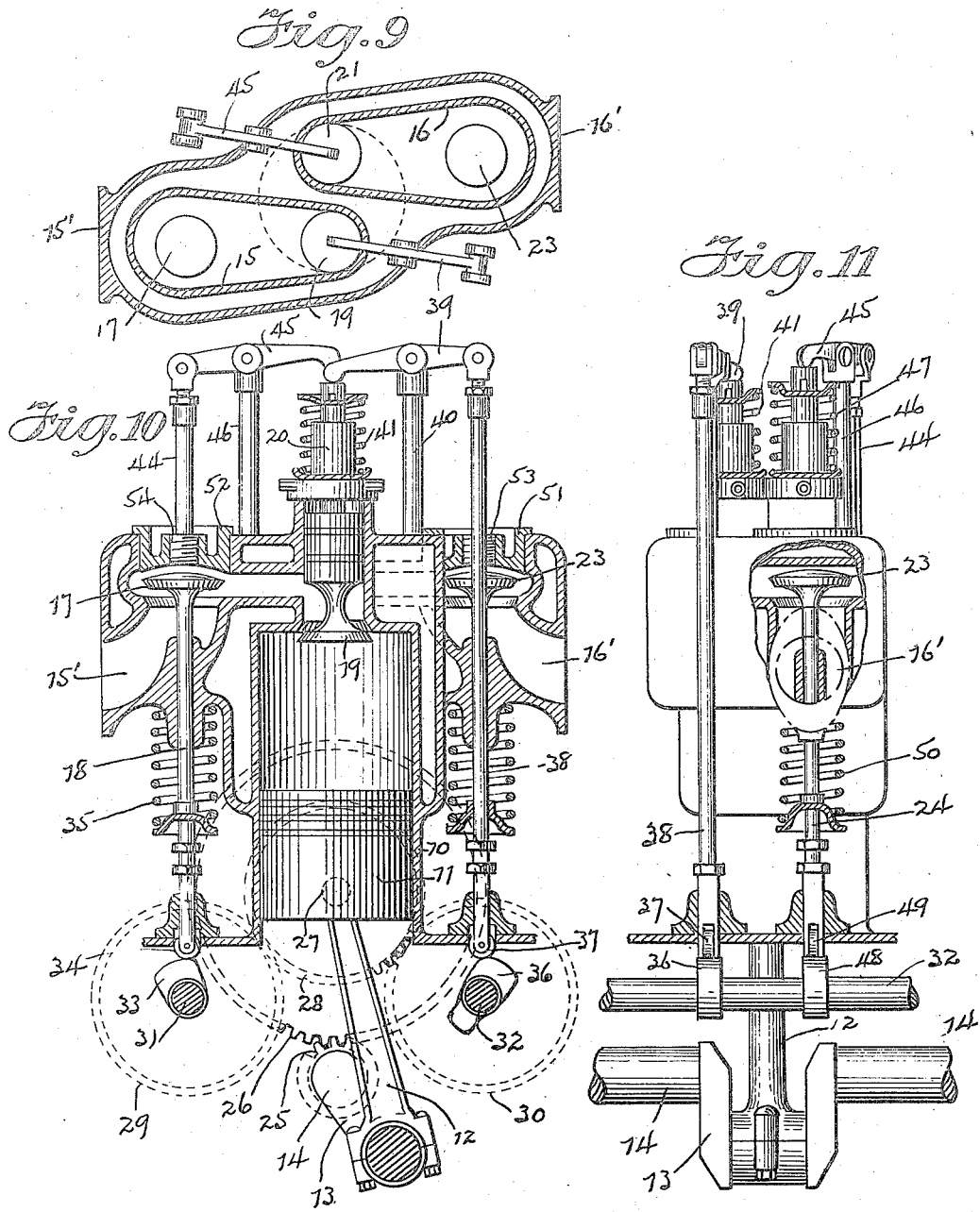

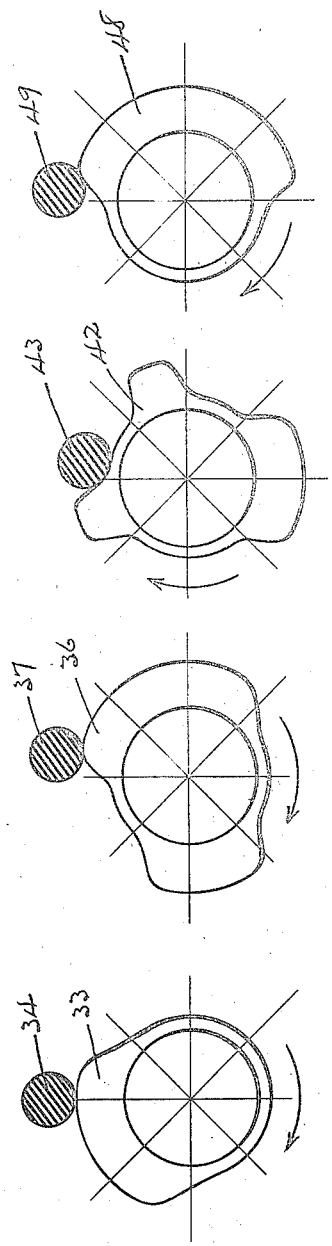

1,622,010

UNITED STATES PATENT OFFICE.

SAMUEL SUMMER, OF ALBANY, NEW YORK, ASSIGNOR OF ONE-HALF TO FRANK S. SUMMER, OF NEW YORK, N. Y.

EXTERNAL-COMBUSTION ENGINE.

Application filed September 26, 1922. Serial No. 590,579.

This invention relates to an external combustion engine and more particularly to an engine in which there is employed a plurality of combustion chambers for each cylinder of the engine with the construction being such that the charges of fuel employed for the operation of the engine are trapped, ignited and burned under substantially constant volume in a combustion chamber into which they have been compressed by a piston in a cylinder of the engine, and while so trapped a complete cycle or a portion of a cycle of engine operations consisting of intake, compression, expansion and exhaust is simultaneously taking place in the cylinder in conjunction with a charge of fuel from another combustion chamber. One of the objects of constructing an engine of this type is to provide more time for the combustion of the fuel charge irrespective of the speed of the engine. One of the important objects of the invention in the present case is to reduce the number of operating parts in an engine of this type, particularly the number of valves employed by the elimination of separate intake and exhaust valves for each combustion chamber by providing only one intake valve for one combustion chamber and only one exhaust valve for the other combustion chamber associated with each cylinder so that the number of operating valves is reduced to four per cylinder, for example, in an engine in which one-quarter of the strokes are power strokes. A further object of the invention is to have the combustion chambers contiguous to the cylinder so as to avoid the use of channels or passageways between the combustion chambers and the cylinder in order that the passage of the gases may be as unrestricted as possible to permit of a ready flow of the gases at high speed in order not to impair the volumetric efficiency of the engine.

Fig. 1 is a more or less diagrammatic longitudinal section illustrating the engine structure, Figs. 2 to 8 inclusive are similar views illustrating the different positions of the operating parts during the different strokes of the piston in the cycle of operation of the engine.

Fig. 9 is a sectional plan of the cylinder head showing independent combustion chambers.

Fig. 10 is a sectional elevation illustrating the engine construction and the valve actuating mechanism.

Fig. 11 is an elevation and partial cross section taken at right angles to the position of the parts as shown in Fig. 10, and Figs. 12 to 15 inclusive, are elevations of the cams employed for operating the valves.

Referring to the drawing, an engine cylinder made in accordance with this invention is indicated at 10. It will be understood that while I have illustrated a single cylinder as a unit any desirable or necessary number of units may be employed to constitute the engine. The cylinder 10 is fitted, as is customary, with a piston 11 and this is connected by a rod 12 to a crank 13 forming part of or connected to the engine drive or power shaft 14.

Associated with each cylinder is a cylinder head in which there are combustion chambers illustrated respectively at 15 and 16. In the combustion chamber 15 there is provided an inlet valve 17 operated by a valve stem 18 by any suitable mechanism, and also in the combustion chamber 15 there is a balanced discharge and intake valve 19 connected to and fitted with a plunger 20 or otherwise. Similarly in the combustion chamber 16 there is a discharge and intake valve 21 connected to and fitted with a plunger 22 or otherwise. This combustion chamber 16 is also fitted with an exhaust valve 23 operated by a valve stem 24 through the necessary mechanism.

In the operation of this engine structure, and by reference to Fig. 1, assuming that the piston is moving downwardly with the intake valve 17 and the valve 19 open, a charge of fuel will be drawn into the cylinder through the combustion chamber 15. During the next stroke of the piston, as will be seen by reference to Fig. 2 the valve 19 is closed and the valve 21 is open so that in the upward movement of the piston the fuel charge will be forced and compressed in the combustion chamber 16, it being understood that the exhaust valve 23 is also closed, having closed at the beginning of this upward stroke.

During the next or succeeding downward stroke of the piston shown in Figure 3 the valve 21 is closed as is also the exhaust valve 23, and the valve 19 is again opened whereby in this movement of the piston another fresh charge of fuel is drawn into the cylinder. During the next or following upward stroke of the piston, as shown in Fig. 4, the inlet valve 17 is closed, while the valve 19 remains open so that the second fresh charge of fuel is compressed and trapped in the chamber 15 by the closing of valve 19 at the end of this stroke.

At any suitable time after the fuel has been compressed and trapped in the combustion chamber 16 at the end of the stroke shown in Fig. 2 the same may be ignited by any suitable system of ignition, and the same is also the case with the fuel charge entrapped in the combustion chamber 15 at the end of the stroke shown in Fig. 4.

Referring now to Fig. 5, on the next or following downward stroke of the piston 11 the valve 21 is opened permitting the ignited gases in the combustion chamber 16 to expand into the cylinder to operate against the piston. In the next succeeding or following upward stroke of the piston the valve 21 remains open and the exhaust valve 23 is also opened whereby the spent gases are forced through the exhaust port as shown in Fig. 6.

In the next following or downward stroke of the piston, as will be seen by reference to Fig. 7, the valve 21 is closed and the valve 19 is opened thereby permitting the ignited gases in the combustion chamber 15 to expand into the cylinder to actuate the piston forcing the same downwardly, whereas in the next following or succeeding upward stroke of the piston the intake port 17 still remains closed and the valves 19 and 21, as well as the exhaust valve 23 are all open so as to remove all of the spent gases as far as the same is possible. At the end of this stroke valve 21 closes. This operation completes the eighth stroke of the cycle of operations of the engine and in the next succeeding downward stroke the cycle begins to repeat itself as hereinbefore described in conjunction with the operation of the parts as shown in Fig. 1.

The valves as hereinbefore described may be operated in sets from suitable cam shafts, for example the valves 17 and 21 may be operated from one cam shaft and the valves 19 and 23 from another cam shaft, while both of the cam shafts may be turned from the driving shaft. Such a construction is illustrated in Fig. 10 wherein as shown, the drive shaft 14 is fitted with a gear 25 which meshes with a gear 26 carried by a counter shaft 27 on which there is also fitted a gear 28. This gear 28 meshes with gears 29 and 30 which are suitably secured to cam shafts 31 and 32 respectively. These cam shafts may be journaled in suitable bearings in which they revolve. These gears are so designed that the cam shafts make one revolution to four revolutions of the drive shaft.

The intake valve 17 is operated from the cam shaft 31 by means of a cam 33 mounted on this shaft and formed as shown in Fig. 13. This cam 33 bears against a roller 34 mounted at the end of the valve stem 18 and the roller is normally maintained in contact with the face of the cam by means of a spring 35 or a suitable equivalent therefor.

The valve 19 making communication between the combustion chamber 15 and the interior of the cylinder 10 is operated by the cam shaft 32 and a cam 36 thereon, the form of this cam being shown in Fig. 14. The cam 36 contacts with a roller 37 carried at the end of a rod 38 which at its opposite end is pivotally connected to a rocker arm 39 mounted on a support 40. The free end of the rocker arm bears against the end of the valve stem 20 and this relationship is maintained by means of a spring 41 or otherwise.

The valve 21 making communication between the combustion chamber 16 and the interior of the cylinder 10 is operated by a cam 42 on the cam shaft 31. This cam 42 cooperates with a roller 43 carried at the end of a rod 44 to the opposite end of which a rocker arm 45 is pivotally connected. This rocker arm 45 is mounted on a support 46 and the free end thereof contacts with the end of the valve stem 22, this relationship being maintained by means of a spring 47 or a suitable equivalent therefor. The exhaust valve 23 is actuated by a cam 48 on the cam shaft 32. This cam 48 bears against a roller 49 at one end of the valve stem 24 and this relationship is maintained by means of a spring 50 or otherwise. The positions of the parts of the apparatus as shown in Figs. 10, 11, and 12 to 15 inclusive, are the same as illustrated in Fig. 1 of the drawing, and as will now be apparent, the valve mechanism as described actuates the valves in such a manner as to cause the operation of the engine as hereinbefore stated. The inlet passage to the combustion chamber 15 is indicated at 15' and the exhaust passage from the combustion chamber 16 is indicated at 16'.

The charges of fuel as compressed in the combustion chambers may be ignited in any suitable manner and at any desirable time depending to some extent at least on the nature of the fuel. In Figure 10 I have illustrated plugs 51 and 52 mounted respectively in the upper walls of the combustion chambers 16 and 15 and each of these is provided with a tapped opening as indicated respectively at 53 and 54 for the reception of a spark plug by means of which and the necessary ignition system the fuel charge is ignited. As hereinbefore stated, the valves 19 and 21 making communication between the combustion chambers and the interior of the cylinder are preferably balanced valves.

I claim as my invention:

1. In an external combustion engine, a cylinder, a piston, combustion chambers independent of each other and associated with the said cylinder, an intake valve for one combustion chamber, an exhaust valve for the other combustion chamber, valves one of which makes communication between one of the combustion chambers and the interior of the cylinder and another of which makes communication between another combustion chamber and the interior of the cylinder and means for operating the said valves whereby charges of fuel are successively compressed and trapped in the combustion chamber having the exhaust valve and then in the combustion chamber having the inlet valve, and thereafter the fuel charge thus compressed in the combustion chamber having the exhaust valve is released into the cylinder to operate the piston and then exhausted from the cylinder, and then the charge of fuel compressed in the combustion chamber having the inlet valve is released into the cylinder to operate the piston and then exhausted from the cylinder.

2. In an external combustion engine, a cylinder, a piston therein, a cylinder head having a pair of independent combustion chambers, a single inlet connection to one combustion chamber, a single exhaust connection from the other combustion chamber, an intake valve for the inlet connection, an exhaust valve for the exhaust connection, valves one of which makes communication between one of the combustion chambers and the interior of the cylinder and the other of which makes communication between the other combustion chamber and the interior of the cylinder and means for operating all the said valves whereby charges of fuel are successively compressed and trapped in the combustion chamber having the exhaust connection and then in the combustion chamber having the inlet connection, and thereafter the charge of fuel thus compressed in the combustion chamber having the exhaust connection is first released into the cylinder to operate the piston and exhausted from the cylinder, and then the charge of fuel compressed in the combustion chamber having the inlet connection is released into the cylinder to operate the piston and then exhausted therefrom.

3. In an external combustion engine, a cylinder, a piston therein, a cylinder head having two independent combustion chambers, a single inlet connection to the first combustion chamber, a single exhaust connection from the second combustion chamber, an inlet valve for the said inlet connection, an exhaust valve for the said exhaust connection, a valve between the said first combustion chamber and the interior of the cylinder, a valve between the second combustion chamber and the interior of the cylinder, and means for operating all the said valves whereby charges of fuel are successively compressed and trapped in the said second combustion chamber and then in the first combustion chamber, and thereafter the charge of fuel as compressed in the second combustion chamber is released into the cylinder to operate the piston and is exhausted from the cylinder, and then the charge of fuel in the first combustion chamber is released into the cylinder to operate the piston and is then exhausted from the cylinder.

4. In an external combustion engine, a cylinder, a piston therein, a cylinder head having two independent combustion chambers, a single inlet connection to the first combustion chamber, a single exhaust connection from the second combustion chamber, an inlet valve for the said inlet connection, an exhaust valve for the said exhaust connection, a valve between the said first combustion chamber and the interior of the cylinder, a valve between the said second combustion chamber and the interior of the cylinder, a cam shaft, cams thereon for actuating the valve in the inlet connection and the valve making communication between the said second combustion chamber and the interior of the cylinder, a second cam shaft, cams thereon for actuating the valve in the exhaust connection and the valve making communication between the first combustion chamber and the interior of the cylinder, and means for operating the said cam shafts to actuate the said valves whereby charges of fuel are successively compressed and trapped in the said second combustion chamber and then in the first combustion chamber, and thereafter the charge of fuel as compressed in the second combustion chamber is released into the cylinder to operate the piston and is exhausted from the cylinder, and then the charge of fuel as compressed in the first combustion chamber is released into the cylinder to operate the piston therein and is then exhausted from the cylinder.

Signed by me this 1st day of Sept., 1922.

SAMUEL SUMMER.